United States Patent [19]
Chayka et al.

[11] 3,882,991
[45] May 13, 1975

[54] LOADING MECHANISM FOR A MACHINE TOOL

[75] Inventors: Joseph P. Chayka, Rochester; David J. Cartner, Royal Oak, both of Mich.

[73] Assignee: The Babcock & Wilcox Company, New York, N.Y.

[22] Filed: Jan. 12, 1973

[21] Appl. No.: 323,004

[52] U.S. Cl. ................................................. 198/19
[51] Int. Cl. ............................................ B23q 7/00
[58] Field of Search ................ 198/19, 179; 214/89

[56] References Cited
UNITED STATES PATENTS
2,684,800   7/1954   Lewis............................. 198/179 X
2,830,712   4/1958   Sykokis........................... 198/179 X

Primary Examiner—Evon C. Blunk
Assistant Examiner—Douglas D. Watts
Attorney, Agent, or Firm—J. M. Maguire, E. A. Mosley

[57] ABSTRACT

A loading mechanism for loading successive work pieces into successive work holders while the work holdings move continuously toward and through a fixed position machine tool. The loading mechanism is fixed in position relative to the machine tool and positions the raw work pieces by clamping in the work holders, so as to insure proper location of the work piece for finishing. The loading and clamping mechanisms are coordinated with the continuous movement of the work holders by interrelated camming devices.

3 Claims, 18 Drawing Figures

LOADING MECHANISM FOR A MACHINE TOOL

The invention relates to a loading mechanism for the sequential delivery of raw work pieces to a transfer mechanism for continuous delivery of the work pieces to a machine tool for furnishing or semi-furnishing of the work pieces. The invention is particularly useful for the delivery of successive work pieces to a broaching tool.

In the prior art, work piece transfer machines of the continuous moving type are sometimes manually loaded. In such machines, the pallets used to support and position the work pieces progress at relatively low speeds and the opening in the pallet to receive the work piece is made relatively only a small amount larger than the transverse dimension of the work piece. Due to the relatively low speed, the operator has time to insert a work piece in position so that it can be successfully clamped in position. As increased production rates require faster progress of the pallets, manual loading becomes more difficult and finally impractical, so that magazine or automatic loading of modern machines becomes highly desirable.

Automatic loading has been accomplished in a number of ways involving various degrees of complication related conjointly to the travel speed of the pallets and the geometry of the work pieces. Specifically, if the pallets are moving relatively slowly and if the pieces to be machined have a relatively small dimension vertically the pieces may merely be dropped into the pallet opening as the pallets come opposite the loading position.

However, when the work pieces are relatively long in the vertical direction mere release, by an escape mechanism, of such pieces to drop into an opening as a pallet passes, the difficulty arises that only a small portion of the lower end of the part has entered the opening when it is struck by the trailing surface of the opening which may deflect the piece out of the pallet or, at least, cause erratic jostling of the piece as it falls. This jostling can easily become intolerable since the piece must finally come to rest on specific locating surfaces before clamping so that the machining will be correct. Increasing pallet speed for desired higher production obviously aggravates the above described difficulty.

One procedure which may be attempted to alleviate the problem is to make the opening in the pallet longer in the direction of pallet movement. This does permit the piece to fall farther into the opening before being struck by the following surface of the opening. However, the longer opening reduces control over the path of the fall and so increases the probability of incorrect final location of the piece.

A further prior art attempt to improve loading of vertically elongated parts involves providing some thrusting mechanism to move the work piece into the pallet at a velocity greater than that of free-fall. Such thrusting mechanisms are invariably complex and introduce the further complication that the thruster must be removed at great velocity in order not to interfere with progress of a pallet after loading.

Probably the most common prior art mechanism for loading continuous broaching machines consists of a loading shuttle. The shuttle is a temporary work holder somewhat similar to a pallet as above described. However, the shuttle moves intermittently and reciprocally parallel to the continuous motion of the pallets. At one end of its motion, the shuttle receives a work piece while stationary. Thereafter, when a pallet opening is approximately opposite the temporarily held piece in the shuttle, the shuttle starts to move synchronously with the pallet. During this synchronous motion the work piece is transferred, by mechanism which may be a part of the shuttle, from the shuttle to the pallet. Such transfer can be effected successfully since there is no relative motion between the shuttle and the pallet. After a transfer, the shuttle is returned idle to its position for receiving a new piece and the cycle is repeated.

Shuttle loaders are subject to obvious objections. For example, the idle return time of the shuttle imposes a delay which limits production rate. Moreover, the shuttle travel must be added to the length of the machine which is undesirable.

According to the invention a fixed workpiece loading device is arranged above a continuously moving transfer mechanism to automatically position successive workpieces in successive work holders mounted on the transfer mechanism. The loading of the workpieces in the workholders is coordinated by cam operated devices to clamp and properly position the workpieces for subsequent machining. Of the drawings:

Figure 1:
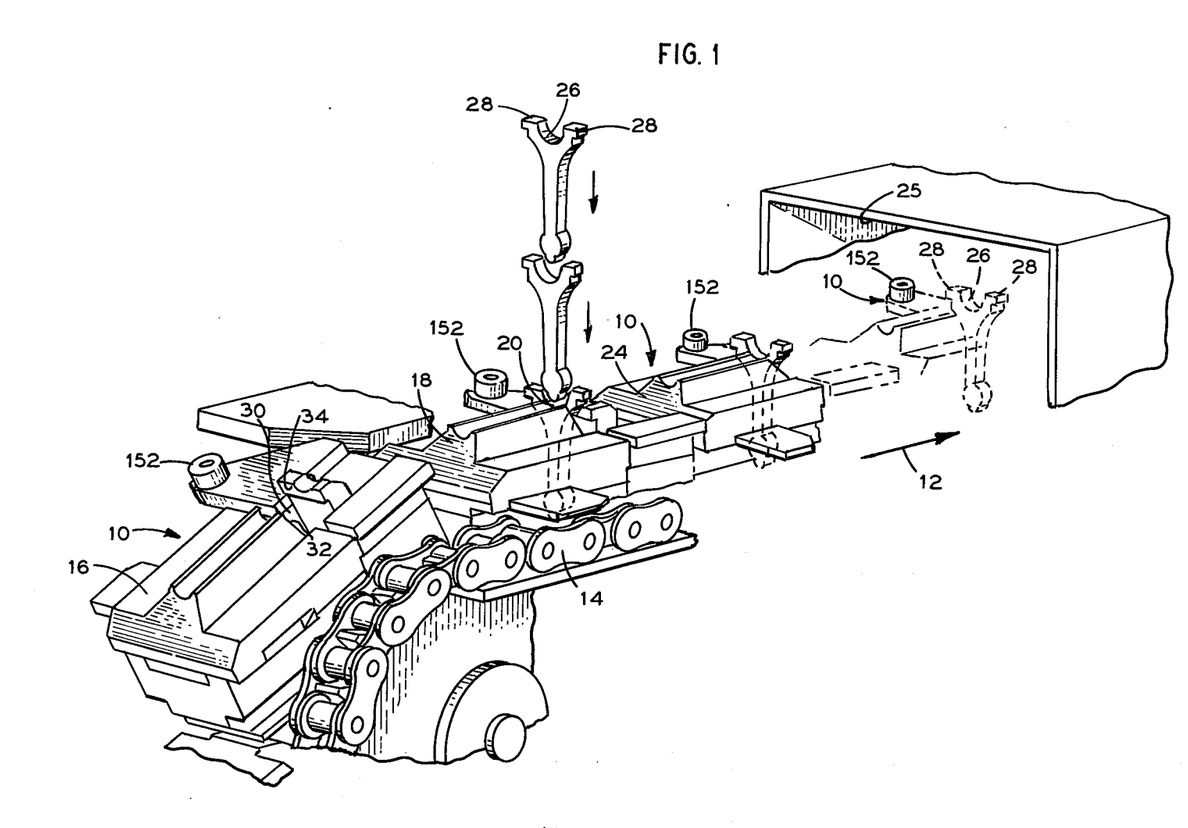
FIG. 1 is a perspective view, partly in section, of a conveying mechanism and an automatic work piece loader constructed and arranged according to the invention.

In the illustrated embodiment of the invention, FIG. 1 shows the general construction of a typical pallet-type continuous broaching machine. In this figure, numeral 10 designates a series of pallets of work holders for carrying a succession of work pieces through the broaching process. The pallets are propelled continuously in the direction of arrow 12 by means of a pair of driving chains. One propelling chain is designated 14 and there is a companion chain on the opposite side of the pallets.

As seen in FIG. 1, the specific pallet designated 16 has previously been unloaded (at the opposite end of the machine) and is approaching a loading position for receiving a raw work piece. The pallet designated 18 has arrived at the loading station and is receiving a raw work piece 20. The process of loading this pallet is the subject of the present invention and this subject will be described in detail hereinafter. Pallets 22 and 24 have passed the loading station and are holding work pieces. Pallet 24 is entering the tunnel or work region 25 wherein stationary broaching tools (not shown) will perform cutting operations on certain portions of the work piece such as, for example, the half-round surface 26 and the flat surfaces 28 of the illustrated work piece.

As seen in FIG. 1, pallet 16 shows an opening 30 for receiving a work piece. Considered longitudinally of the machine work receiving opening 30 is defined by a stationary (relative to the pallet) jaw 32 and a movable jaw 34.

Figure 2:
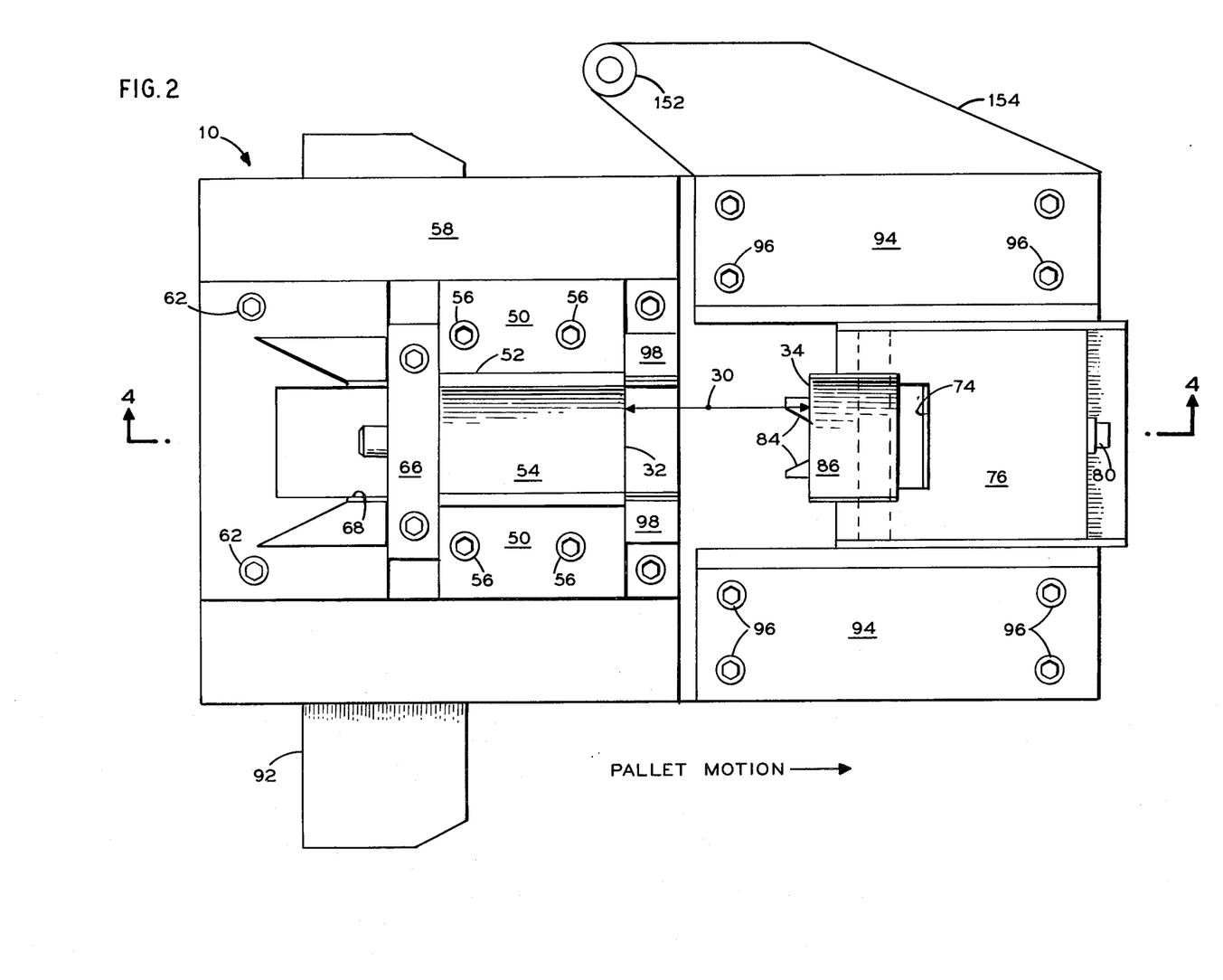
FIG. 2 is a plan view of a pallet shown in FIG. 1.

FIG. 2 shows a plan view of a pallet 10 similar to those shown in FIG. 1. Here, the work receiving space 30 is shown between the fixed clamp jaw 32 and the movable jaw 34.

Figure 3:
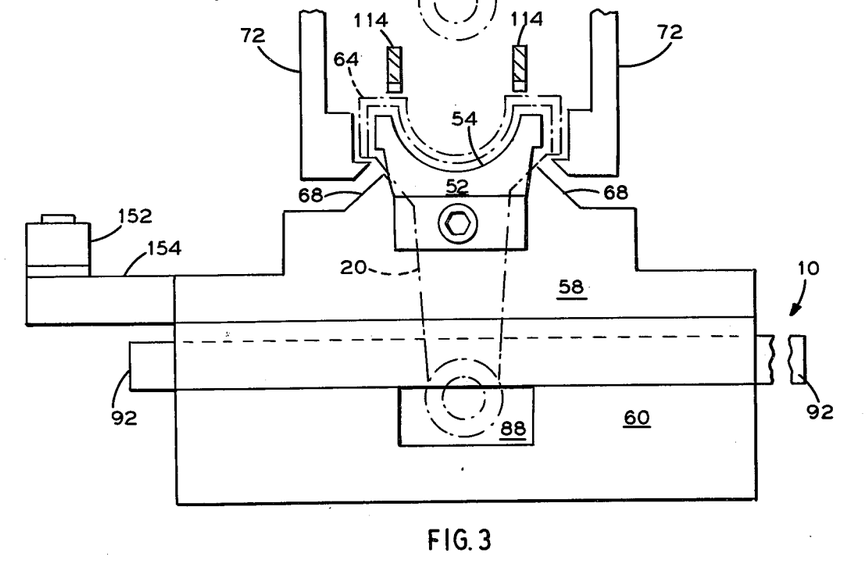
FIG. 3 an end view of the pallet shown in FIG. 2.
Figures 4, 8A:
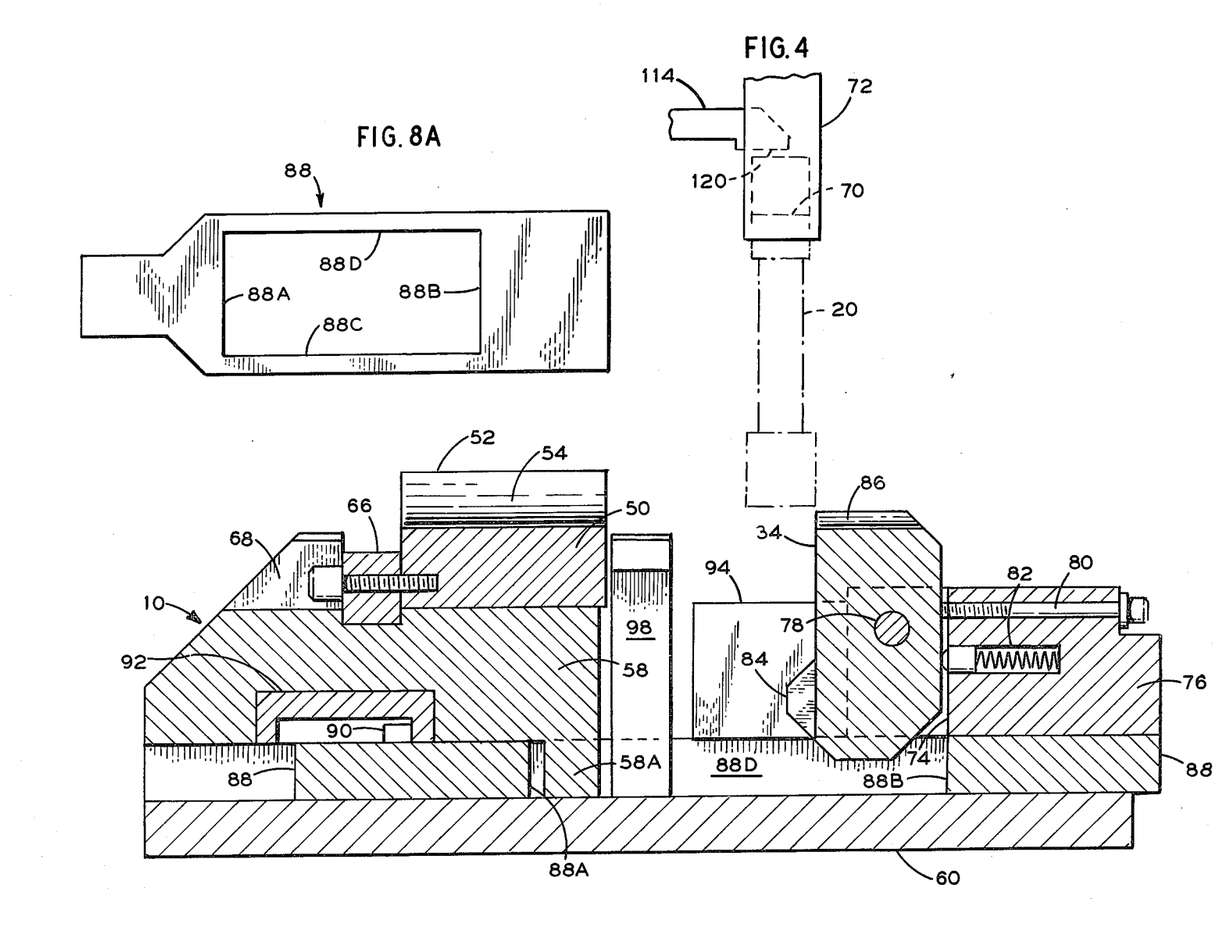
FIG. 4 is a vertical section taken on line 4—4 of FIG. 2.
FIG. 8A is a plan view of a portion of the loading mechanism.

FIG. 3 is an end view of the pallet 10 seen as moving away from the observer. FIG. 4 is a vertical sectional view of pallet 10 taken substantially as indicated by 4—4 in FIG. 2. As seen in FIGS. 2, 3 and 4, the fixed jaw 32 consists of a foot portion 50 and an integral upstanding abutment portion 52 which includes a semicylindrical upper configuration indicated by numeral 54. The foot 50 of jaw 32 is secured, as by screws 56 to a block 58 which is a major constituent of the body of pallet 10. Block 58 is secured to the main base 60 of pallet 10 by screws 62 and by other screws not shown.

FIG. 3 includes a showing in broken lines, of a typical work piece 20 (see also FIG. 1) in final location for broaching. The work piece shown is an automotive engine connecting rod but its main characteristic pertinent to the invention is that its vertical dimension is relatively large.

As seen in FIG. 3, the upper configuration of the abutment 52 is dictated by the shape of the work piece and by the cutting to be done. The numeral 64 represents material present on the raw work piece which is to be removed by broaching. The semicylindrical surface 54 and the ears or horns flanking this surface all come within the final shape of the work piece and, thus, permit passage of the broaching tools while still providing strong support of the work piece against cutting forces.

The cutting force exerted against the abutment 52 is transmitted to the body block 58 by means of a key or spacer 66 which is fitted into a groove in the block 58 and is backed up by upstanding extensions 68 of block 58.

Figure 3A:
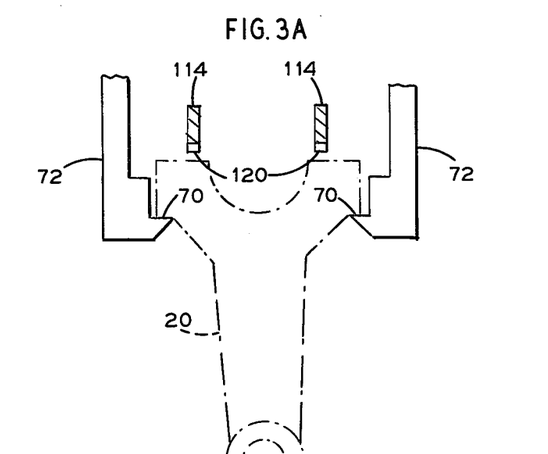
FIG. 3A is an end view showing a workpiece prior to engagement in the pallet shown in FIG. 3.

FIG. 3A shows a work piece suspended above the pallet prior to lowering into working position. The transfer from the position in FIG. 3A to that in FIG. 3 will be explained by progressive stages below.

FIG. 4 shows a pallet just entering the loading position in its progress from left to right. By means yet to be described, the work piece 20 has been lowered until its lower end is just above the top of and just left of the face of movable jaw 34. During this lowering movement, the work piece 20 is suspended on two ledges 70 of the two arms 72 of a fork-like vertically travelling carriage which will be more fully described hereinafter. For present purposes, it is sufficient to note that the arms 72 descend in accurate timed relation with the progress of the pallet.

Referring further to FIGS. 2 and 4, the jaw 34 fits in a slot 74 formed in a sliding block 76. Jaw 34 is pivoted on a pin 78 for a very slight rocking motion. This rocking motion is restrained clockwise by an adjusting screw 80 and is normally urged against that screw by a spring plunger 82. Below the pin 78, the jaw 34 is provided with two angularly divergent projections 84. As will appear below, the fork formed by these projections will subsequently engage the vertical arm portion of the work piece 20 and contribute to the accurate positioning of that work piece.

Figure 7:
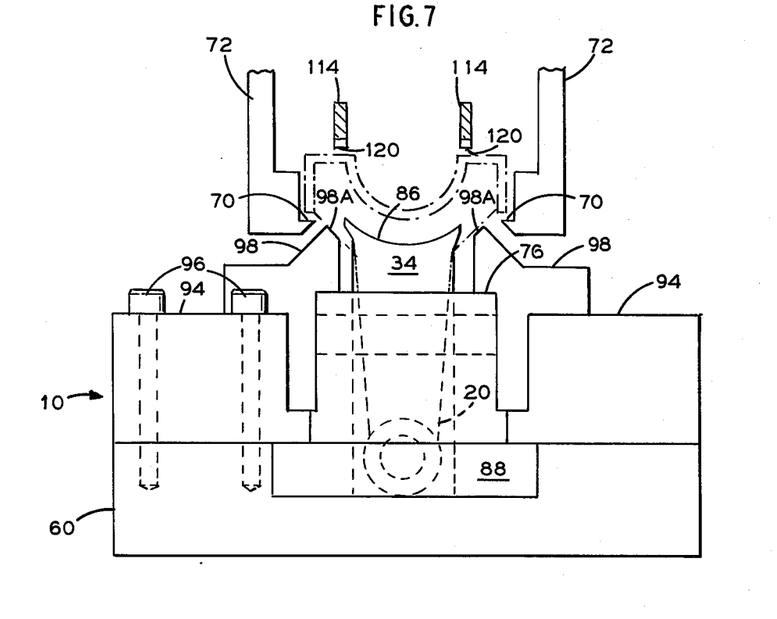
FIG. 7 is an end elevation view of a pallet.

The top surface of jaw 34 is formed with a semicylindrical surface 86. The surface 86 is best seen in FIG. 7 which is an end view of the pallet with a work piece fully inserted and approaching the viewer.

The sliding block 76 (FIGS. 4 and 7) is attached, as by screws not shown, to a draw bar 88. Toward its left end (FIG. 4), the draw bar 88 supports a cam follower pin 90. Pin 90 engages a cam track formed in an actuating bar 92. As the pallet 10 progresses, a long tapering cam bar (not shown) attached to the machine frame forces the bar 92 upward as shown in FIG. 2 or away from the viewer as seen in FIG. 4. The cam track in bar 92 acts upon pin 90 to move the draw bar 88 leftward (FIG. 4) relative to the base 60 and body block 58 as the pallet 10 progresses. The configuration of the cam track in bar 92 is not detailed in the figures and, in fact, can vary from one embodiment of the invention to another. In general, this cam track provides a relatively fast constant motion of draw bar 88 during the first part of the cam-induced motion of bar 92 followed by a very much slower but more forceful action thereafter.

Figure 8:
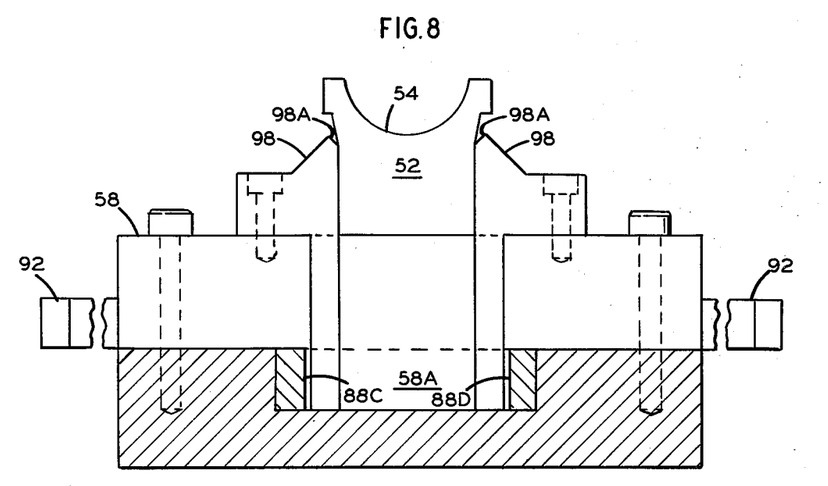
FIG. 8 is an end section elevation view of a pallet.

The right end (FIG. 4) of the draw bar 88 fits into a guide slot in the base plate 60 (see FIG. 7) and is retained in that slot by body blocks 94 which are attached, as by screws 96, to the base 60. Intermediate the ends of bar 88 is a rectangular opening of which the length is defined in FIG. 4 by surfaces 88A and 88B. The width of this rectangular opening is defined by FIG. 8 by numerals 88C and 88D. FIG. 8 is a section taken substantially as indicated by 8—8 in FIG. 5. The purpose of the openings 88A, B, C, D is to permit the jaw 34 and the workpiece 20 to project nearly to the top of plate 60. The opening also permits guide members 98 and a downward extension 58A of block 58 to reach into the guide groove in plate 60. The purpose of these latter provisions will become clear when the final clamping action on work piece 20 is discussed below. As shown in FIG. 3, the left end (FIG. 4) of the draw bar 88 is narrower than the right end (FIG. 7). The reduction in width occurs to the left (FIG. 4) of the surface 88A. For further clarification, FIG. 8A shows a detail plan view of the draw bar 88.

Figure 5:
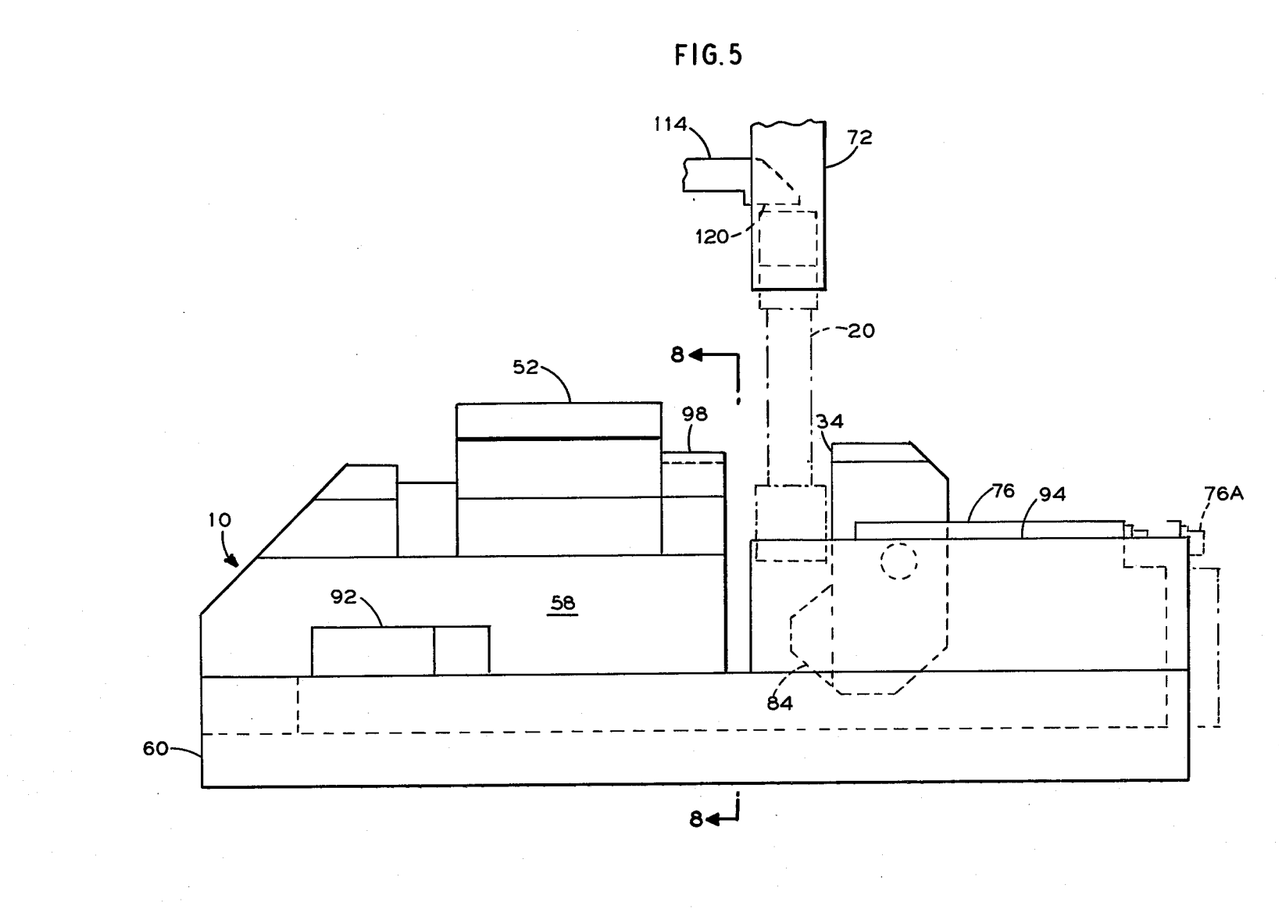
FIG. 5 is a vertical view similar to the section shown in FIG. 4.

FIG. 5 is generally similar to FIG. 4 except that it is an elevation rather than a section view. In FIG. 5, the pallet 10 has progressed further in its continuous motion to the right. By cam action, yet to be explained, the rightward motion of the pallet 10 has caused further lowering of the support device 72 and the work piece 20. During this same progress of the pallet, bar 92 has been further cammed inward and has caused continued leftward motion of the sliding block 76 relative to the base 60. (The original location of block 76 is indicated by chain lines designated 76A). This leftward motion has, of course, carried the jaw 34 closer to the abutment 52 thus reducing the original opening 30 as shown in FIG. 2.

Notice is particularly directed to the fact that the downward motion of work piece 20 and its support 72 is vertical. By comparing FIGS. 4 and 5, it is seen that the horizontal spacing between part 20 and jaw 34 has not changed whereas the space between part 20 and abutment 52 and block 58 has been reduced. These relations are explained by the fact that bar 92 causes block 76 and jaw 34 to move leftward relative to the base 60 at the same rate as the pallet progresses rightward relative to part 20. Thus, in effect, the jaw 34 remains stationary relative to piece 20 during the loading process while the gap 30 (FIG. 2) is closing up due to onward progress of the abutment 52 and the block 58; the latter being effectively integral parts of pallet 10. Part 20 remains under control of 100 during entire loading process.

By the action described in the preceding paragraph, the part 20 receives some guidance from jaw 34 during the loading process even though the original opening 30 was very wide relative to the piece 20. As the pallet progresses further to the right and the piece 20 lowers more, the forked members 84 straddle the lower part of piece 20 and provide further guidance. Specifically, the support of the part 20 by ledges 70 contacting unmachined portions of the part may result in the shank of the part not being quite vertical. As the lower end of part 20 passes between the fork arms 84, there occurs at least a partial correction of any deviation from vertical. As will appear below, this corrective action increases as clamping is completed.

Figure 6:
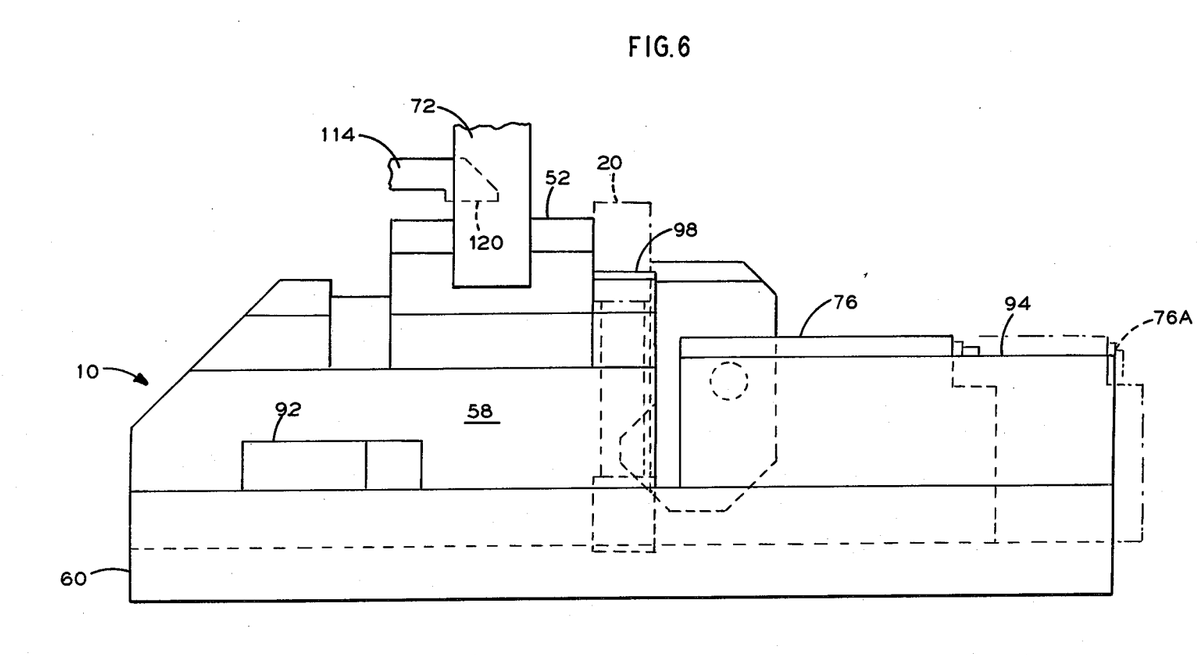
FIG. 6 is a vertical view showing movement of a pallet from the position shown in FIG. 5.

FIG. 6 shows pallet 10 progressed still further to the right with respect to the loading device 72. During the movement from the relative positions of FIG. 5 to those of FIG. 6, the part 20 completed its downward motion. Also, the space between abutment 52 and jaw 34 was reduced to that occupied by the thickness of part 20. These and other differences between FIGS. 5 and 6 require some detailed description.

As the downward motion of part 20 and the relative closing between abutment 52 and jaw 34 continued, the left side of the lower end of 20 came in contact with the adjacent face of the block 58 slightly before the upper end of 20 made contact with abutment 52. This is because the slight clockwise bias of jaw 34 (see FIG. 4 and previous description) caused the fork prongs 84 to incline the piece 20 slightly to the left at its lower end. The contact of 20 against block 58 caused force from the plunger 82 to be exerted by way of the fork arms 84 and the piece 20 against block 58. As a result of the said force, the jaw 34 was rocked a small amount counterclockwise. The final result of this rocking was to cause the upper end of jaw 34 to press the top portion of piece 20 against the abutment 52. However, during the rocking of jaw 34, the slipping friction of the fork arms on the shank of piece 20 exerted a downward force which brought complementary portions of the piece 20 firmly against the locating tips 98A of the guide members 98 (see FIG. 7). Thus the vertical guidance of the tapered fork arms 84 plus the downward urging assured correct positioning of the work piece 20 as finally shown in FIG. 7. Note in FIG. 7 that the supporting ledges 70 of the loading carrier 72 went down slightly farther than the work piece so that the above described locating action by jaw 34 could occur without interference.

The previously mentioned cam track in bar 92 is so shaped that the driving inclination for draw bar 88 changes from a rather fast angle to a very slow wedge-angle at substantially the point where firm contact between the upper part of jaw 34, the piece 20 and abutment 52 is established. Further cam-actuation of bar 92 causes the wedge-angle portion of the cam track to apply firm and irreversible clamping force on the work piece between abutment 52 and jaw 34.

Referring again to FIG. 6 shows that the pallet has progressed to such an extent that the clamped work piece has moved to the right of the loading position which is still defined by the vertical path of the loading device 72. Referring back to FIG. 3, it is seen that clearance is provided between the bottoms of the loading arms 72 and nearby surfaces of the block 68. This clearance provides the important feature that a continuously moving pallet can carry along the clamped work piece without any complex or special means for disengaging the loaded piece from the loading mechanism.

Figure 9:
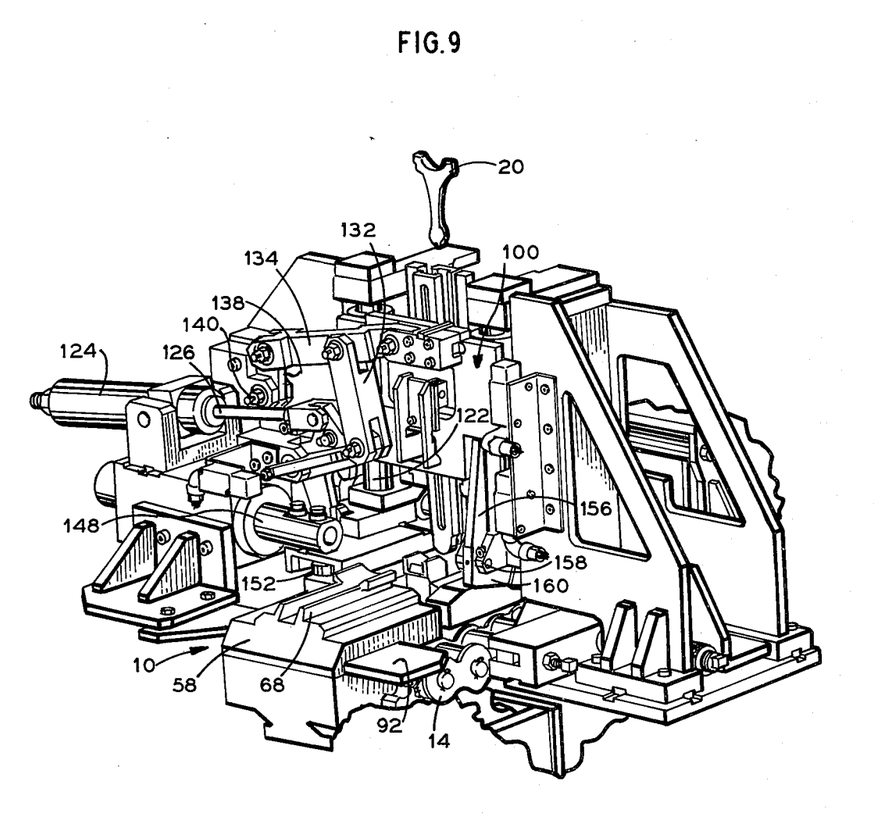
FIG. 9 is a perspective view similar to FIG. 1 showing additional details of the loading mechanism.
Figure 10:
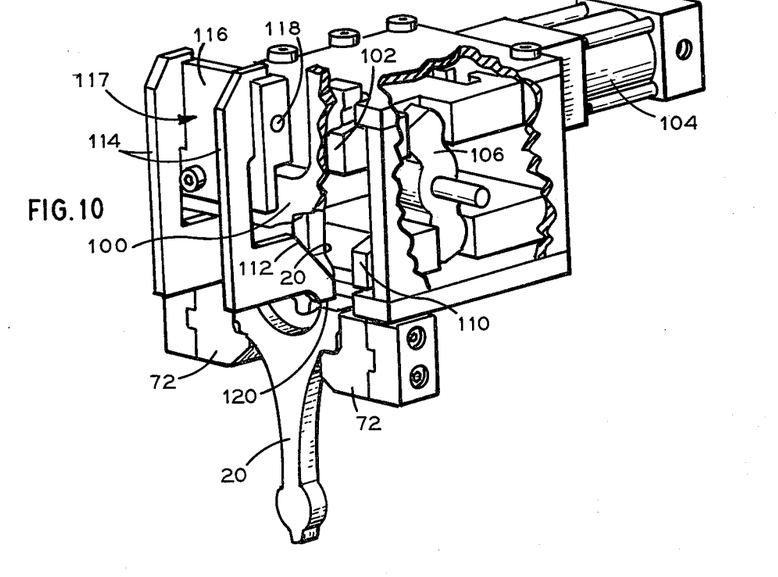
FIGS. 10, 11 and 12 are detailed fragmentary perspective views of a portion of the apparatus shown in FIG. 9.

In this description so far, it has merely been assumed that the descent of a work piece has been synchronized with the progress of a pallet. Attention is now directed to FIGS. 9 and 10. In FIG. 9, numeral 100 designates a vertically reciprocable slide for supporting a work piece 20 to be loaded presently into the oncoming (rightward moving) pallet 10. In FIG. 10, the mode of supporting the piece 20 is shown more clearly. The walls of the slide 100 are mostly broken away in FIG. 10. As already partially shown in FIG. 3, the work piece is supported by suitably shaped blocks 72.

Figure 11:
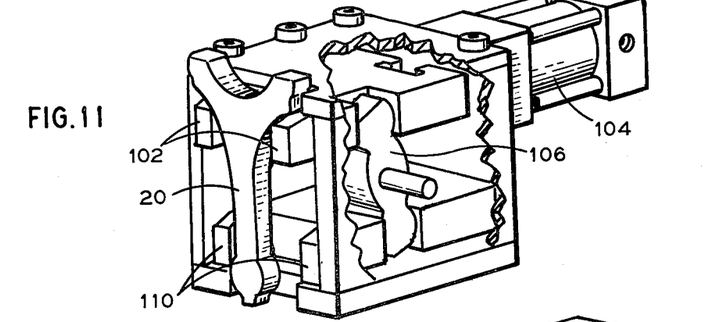
Figure 12:
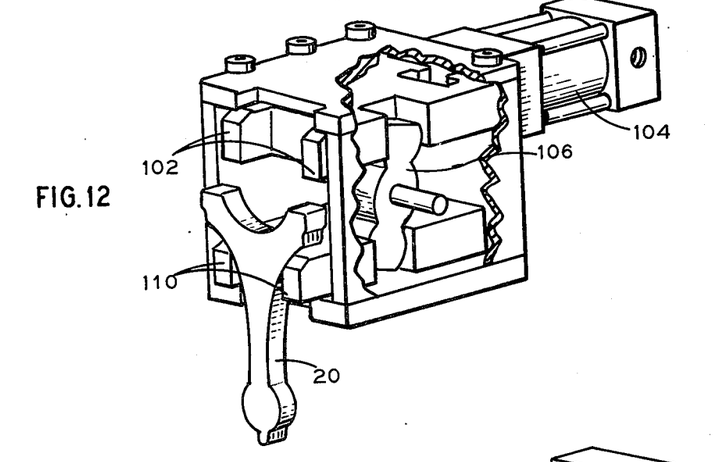

FIGS. 11 and 12 are similar to FIG. 10 but are still more fragmentary. FIG. 11 shows the work piece 20 in its first resting place after entering the mechanism of slide 100. The piece may be dropped from a suitable chute into the position shown in FIG. 11. In that position, it is temporarily supported by the upper escapement bars 102. This temporary support establishes control of the further progress of the piece to be loaded. At a suitable (non-critical) time before the slide 100 has moved a substantial distance downward, air or an hydraulic liquid is introduced into the actuator 104 which retracts the bars 102 toward itself. This retraction causes rocking of the arm 106 on its pivot shaft 108 which, in turn, causes outward motion of the second set of escapement bars 110. Retraction of bars 102 and extension of bars 110 permits the piece 20 to drop from its position in FIG. 11 to that in FIG. 12. Shortly (not critical time) after the piece reaches its FIG. 12 position, the actuator is caused again to extend bars 102 and (by way of the rocker arm 106) to retract bars 110. This retraction of bars 110 allows a further drop of piece 20 to its position in FIG. 10 where it is supported by blocks 72. The bars 102 are now extended to receive the next work piece released from the supply chute (not shown).

The escapement process of getting the work piece 20 from its position in FIG. 11 to that in FIG. 10 is merely one means of controlling rate and orientation and is not a part of the invention. However, an important feature of the FIG. 10 configuration is yet to be mentioned.

As the work piece 20 falls from its position in FIG. 12 to that in FIG. 10, the outer extremities (in width) of the piece must strike the sloping surfaces 112 of the arms 114. The arms 114 are connected (as by welding) to a plate 116. The arms 114 and the plate 116 then form a gate generally designated as 117 which is pivoted on a rod at 118. The falling of the work piece along the sloping surfaces 112 swings the gate 117 outward (leftward in FIG. 10) to allow its passage. When the piece has passed, the gate 117 swings back to its normal position by gravity which brings the tips 120 of arms 114 into position slightly above the top of work piece 20 (see also FIGS. 3 through 7). This positioning of the arms 114 above the work piece provides for positive downward force by slide 100 on work piece 20 in case it is needed to overcome some slight interference friction in the pallet clamping mechanism or if the downward motion of slide 100 is faster than that provided by gravity.

Returning to FIG. 9, slide 100 is provided with passages through which bars 122 pass for guiding that slide in its vertical motion.

The slide 100 is normally held at the top of its stroke by means of a counter-balancing spring enclosed in a cylindrical housing 124. This spring (not visible) acts against a piston attached to the rod 126 in such a way as to urge the rod 126 inward relative to the cylinder 124. The outer end of rod 126 is attached by a clevis and pin to one extension of a bell crank 128 which is pivoted to the machine frame by a pin at 130. A second extension of bell crank 128 is pivotally attached to one end of a link 132. The opposite end of link 132 is pivotally connected intermediate the ends of lever 134. One end of lever 134 is pivoted by pin 136 to the slide 100. The opposite end of lever 134 is pivotally connected by way of a link 138 to the frame of the machine at pin 140. Thus, the spring in cylinder 124 urges the slide upward by means of the linkages described.

Figure 13:
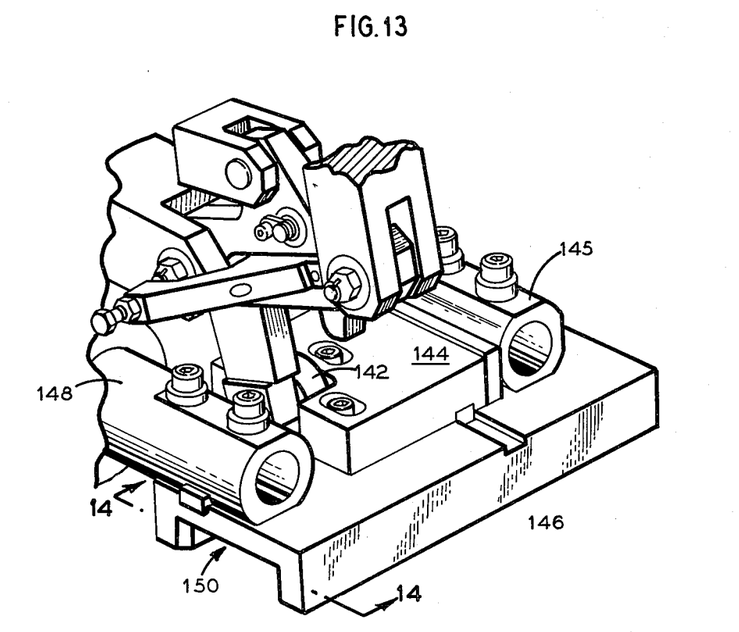
FIG. 13 is a fragmentary perspective view of a detail shown in FIG. 9.

A third extension of bell crank 128 extends generally downward and carries a cam-follower roller 142. This roller rides in a notch in the block 144 which is secured to a larger sliding block 146 (see also FIG. 13). The block 146 is supported by guide bars 148 free to move axially in mating bores in the machine frame. If the block 146 is moved toward the left (as seen in FIGS. 9 and 13), block 144 is carried along and the slot therein exerts force on the roller 142. This force will cause the bell crank 128 to pivot clockwise about the pin 130. By previous description it is seen that pivoting the bell crank clockwise will oppose the spring in cylinder 124 and cause downward movement of slide 100.

Figure 14:
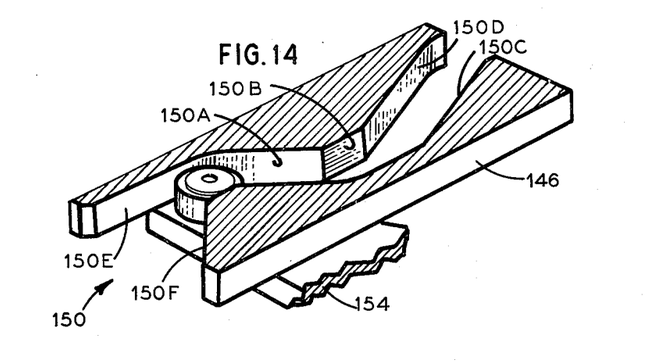
FIG. 14 is a section view taken along line 14—14 of FIG. 13.

The under side of block 146 has a cam slot 150 machined in it. The form of slot 150 is shown in FIG. 14 which is a sectional view taken as shown by 14—14 in FIG. 13. A follower roller 152 is adapted to engage the sides of the cam slot 150. As shown in FIGS. 1, 2, 3, and 9, there is a roller 152 attached by means of a bracket 154 to each pallet 10. As a given pallet approaches the loading position (see FIGS. 1 and 9) its roller 152 enters the cam slot 150.

When the roller 152 has reached about the location shown in FIG. 14, it begins to exert force against the wall portion 150A of the cam slot 150. This force moves the blocks 146 and 144 in the direction to cause lowering of the slide 100; as previously described. This lowering action corresponds to pallet positions a bit before that corresponding to FIG. 4 to that somewhat before correspondence with FIG. 6. In other words, the insertion and clamping interval previously described.

While the pallet is carrying its roller 152 along the portion 150B (parallel to pallet motion) of cam slot 150, no motion is imparted to slide 100 which remains in its lowermost position. This dwell at the bottom of the loading stroke permits unimpeded forward removal of the loaded piece from the supports 72. The last mentioned action is illustrated by the distance the work piece 20 is to the right of support 72 in FIG. 6.

When the pallet advances still farther in FIG. 14, the cam surface 150C and/or the surface 150D acts upon roller 152. This moves blocks 146 and 144 outward from the machine frame and hence, by way of described linkages, causes slide 100 to rise to its original position. Whether surface 150C or 150D effects this action depends upon whether the counterbalancing spring in cylinder 124 has more or less than enough force to raise slide 100 alone. In fact, due to changes in spring compression and/or changes in mechanical advantage of the several levers, the cam track 150 may provide some lifting force for slide 100 during part of the stroke and may be applying restraint to the counterbalance spring during other parts. The significant fact is that the cam slot 150 guides roller 152 on both sides so that down and up motion of slide 100 is definitely synchronized to the motion of the pallet being loaded. As previously explained, this definite synchronization is essential to the loading and clamping sequence described in relation to FIGS. 2 through 7.

The wide tapering entry to cam track 150 formed by surfaces 150E and 150F provide merely a safety feature. If the loading slide 100 should be down (due to failure of the spring in cylinder 124, for example) as a pallet approaches it, the block 146 will be displaced leftward (as seen in FIG. 9). In this case, roller 152 would be engaged by surface 150F and would raise slide 100 prior to arrival at the proper place for lowering that slide.

Figures 15, 16:
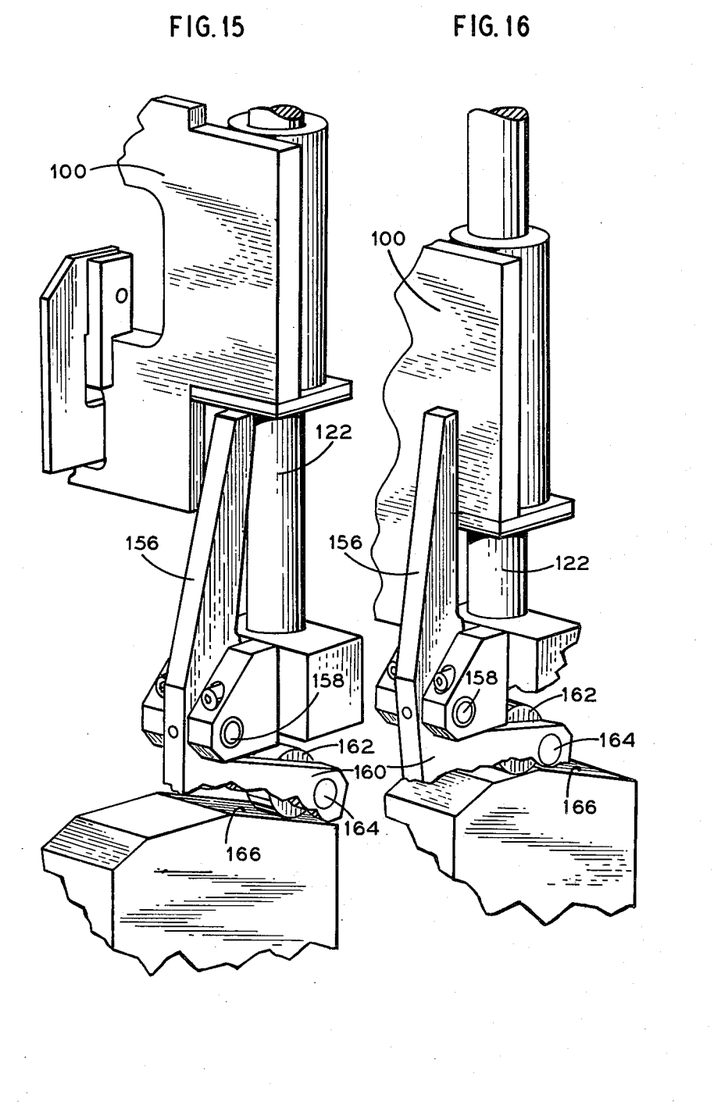
FIGS. 15 and 16 are perspective views of another portion of the apparatus shown in FIG. 9.

A further safety feature is illustrated in FIG. 9 and more specifically in FIGS. 15 and 16. A supporting arm 156 is pivoted on pin 158 which is attached by a bifurcated bracket to the machine frame. An angularly disposed extension 160 of the arm 156 supports a roller 162 by means of a pin 164. When the slide is fully up and no pallet is in work-receiving position, the arm 156 is held by the weight of extension 160 and roller 162 against the guide bar 122 and under a portion of the body of slide 100 (FIGS. 9 and 15). In this position, the slide 100 will be held up in case some of its actuating linkage is disassembled for maintenance, for example. As a pallet approaches loading position in regular operation a sloping surface portion 166 of a pallet moves under the roller 162 raising it and rocking the arm 156 out from under the slide while a work piece is being loaded. Outward rocking of arm 156 permits the downward motion of slide 100 for loading, as fully described hereinbefore.

What is claimed is:

1. A machine tool having a plurality of workpiece holding pallets, means for moving the pallets sequentially past a fixed raw workpiece loading station and past at least one workpiece working position at a controlled substantially constant rate; each of the workpiece holding pallets having a first fixed jaw and a second moveable jaw defining a recess to receive the workpiece; the second jaw being moveable relative to the first jaw in a direction parallel to and opposite the direction of pallet movement; the improvement comprising loading means at the loading station for holding workpieces and adapted for moving a workpiece normal to the direction of movement of a movement of a pallet; first cam-actuated means responsive to the position of a pallet for causing the loading means to insert a workpiece into the work receiving recess of a pallet while that pallet is passing the loading station; second cam-actuated means responsive to the position of the pallet for moving the second jaw toward the first jaw while the pallet is passing the loading station; the second jaw includes guide means on the face thereof adjacent the first jaw to restrain lateral movement of the workpiece and to properly position the workpiece when clamped between the jaws; the first and second cam-actuated means being coordinated so that the workpiece initially enters the work receiving recess close to the second jaw and the workpiece remains close to the second jaw throughout the time that the recess between the two clamping jaws is being reduced by movement of the pallet to a clamping engagement with the workpiece.

2. A machine tool having a plurality of workpiece holding pallets, means for moving the pallets sequentially past a fixed raw workpiece loading station and past at least one workpiece working position at a controlled substantially constant rate; each of the workpiece holding pallets having a first fixed jaw and a second moveable jaw defining a recess to receive the workpiece; the second jaw being moveable relative to the first jaw in a direction parallel to and opposite the direction of pallet movement; the improvement comprising loading means at the loading station for holding workpieces and adapted for moving a workpiece normal to the direction of movement of a pallet; first cam-actuated means responsive to the position of a pallet for causing the loading means to insert a workpiece into the work receiving recess of a pallet while that pallet is passing the loading station; a plurality of vertically spaced support arms are actuated by the first cam means to progressively move a workpiece downwardly into the recess of a pallet; second cam-actuated means responsive to the position of the pallet for moving the second jaw toward the first jaw while the pallet is passing the loading station; the first and second cam-actuated means being coordinated so that the workpiece initially enters the work receiving recess close to the second jaw and the workpiece remains close to the second jaw throughout the time that the recess between the two clamping jaws is being reduced by movement of the pallet to a clamping engagement with the workpiece.

3. A machine tool according to claim 2 wherein guide means maintain a workpiece in an upright posture during downward loading movement.

* * * * *